(12) United States Patent
Berge et al.

(10) Patent No.: US 8,649,102 B2
(45) Date of Patent: Feb. 11, 2014

(54) OPTICAL ELECTROWETTING DEVICE

(75) Inventors: Bruno Berge, Lyons (FR); Nicolas Verplanck, Lyons (FR); Mathieu Maillard, Lyons (FR); Julien Legrand, Lyons (FR)

(73) Assignee: Parrot S.A., Paris (FR)

( * ) Notice: Subject to any disclaimer, the term of this patent is extended or adjusted under 35 U.S.C. 154(b) by 41 days.

(21) Appl. No.: 13/141,480

(22) PCT Filed: Dec. 23, 2009

(86) PCT No.: PCT/IB2009/008014
§ 371 (c)(1),
(2), (4) Date: Oct. 7, 2011

(87) PCT Pub. No.: WO2010/073127
PCT Pub. Date: Jul. 1, 2010

(65) Prior Publication Data
US 2012/0026596 A1    Feb. 2, 2012

Related U.S. Application Data (60) Provisional application No. 61/140,457, filed on Dec. 23, 2008.

(51) Int. Cl.
    *G02B 3/14*      (2006.01)

(52) U.S. Cl.
USPC .......................................... 359/665; 359/666

(58) Field of Classification Search
USPC .................................. 359/228, 665, 666, 667
See application file for complete search history.

(56) References Cited

U.S. PATENT DOCUMENTS

| | | | |
|---|---|---|---|
| 5,217,649 A | 6/1993 | Kulkarni et al. | |
| 7,443,596 B1 | 10/2008 | Berge | |
| 2004/0227838 A1 | 11/2004 | Atarashi et al. | |
| 2006/0126190 A1 | 6/2006 | Berge et al. | |
| 2007/0002455 A1 | 1/2007 | Berge et al. | |
| 2010/0149651 A1* | 6/2010 | Berge et al. | 359/666 |
| 2010/0177386 A1* | 7/2010 | Berge et al. | 359/557 |

FOREIGN PATENT DOCUMENTS

| | | | |
|---|---|---|---|
| EP | 1 662 276 A1 | 5/2006 | |
| EP | 2 009 468 A1 | 12/2008 | |
| WO | 2006/136612 A1 | 12/2006 | |
| WO | 2006/136613 A1 | 12/2006 | |

OTHER PUBLICATIONS

International Search Report from PCT/IB2009/008014 dated Jun. 25, 2010 (3 pages).
Written Opinion from PCT/IB2009/008014 dated Jun. 25, 2010 (5 pages).

* cited by examiner

*Primary Examiner* — Ricky Mack
*Assistant Examiner* — William Alexander
(74) *Attorney, Agent, or Firm* — Osha Liang LLP (57) ABSTRACT

The invention concerns an optical electrowetting device a body comprising at least a first external surface and a second internal surface with a conical shape; a liquid-liquid interface between a first and a second immiscible liquids, the first liquid being a conducting liquid and the second liquid being an insulating liquid, wherein the liquid-liquid interface is able to move on the second internal surface by electrowetting effect; a first electrode in contact with the first liquid; a second electrode insulated from the first liquid by an insulating layer, the second electrode comprising at least a first electrical conductive track to be connected to a voltage source and extending from the first external surface of the body to the second internal surface; and a first layer covering the second internal surface of said body and being covered by the insulating layer, wherein the shape of the liquid-liquid interface is controllable by application of at least a first voltage between the first electrode and the first electrical conductive track, and wherein at least one of the body or the first layer is made of a resistive material.

21 Claims, 6 Drawing Sheets

OPTICAL ELECTROWETTING DEVICE

FIELD OF THE INVENTION

The invention relates to an optical electrowetting device and to an optical imaging device comprising such optical electrowetting device.

BACKGROUND OF THE INVENTION

Electrowetting devices, and in particular electrowetting liquid lenses having a variable focal length, are known in the art, and generally comprise a refractive interface between first and second immiscible liquids that is movable by electrowetting.

Figure 1:
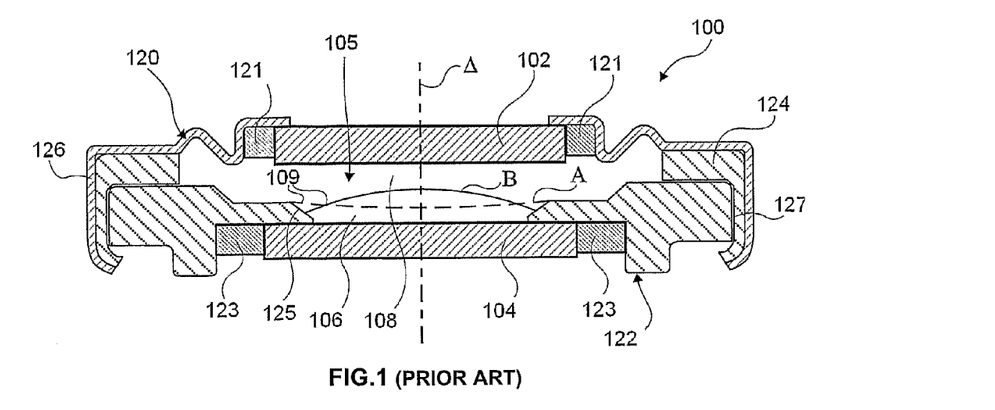
FIG. 1 (described above) is a cross-section view of a liquid lens according to the prior art.

FIG. 1 represents FIG. 4 of European Patent Application EP 1662276, and illustrates a variable focus lens 100 according to one example of the prior art. Lens 100 comprises two transparent windows 102, 104, arranged in parallel and facing each other, and delimiting, in part, an internal volume 105 containing two immiscible liquids 106, 108, with different optical indices. Where the two liquids meet they form an optical interface 109 in the form of a meniscus, which can have a number of different shapes, examples being shown by lines A and B. The liquids 106, 108 have substantially equal densities, and one is preferably an insulating liquid, for example comprising oil and/or an oily substance, and the other is preferably a conducting liquid comprising for example an aqueous solution.

Windows 102, 104 may be transparent plates or lenses formed of an optical transparent material such as glass or plastic.

The structure of the lens 100 that contains the liquids comprises a cap 120 to which transparent window 102 is fixed, for example by glue 121, and a body 122 to which transparent window 104 is fixed, for example by glue 123. The cap 120 and body 122 are separated by a gasket 124. Cap 120 comprises a substantially cylindrical side wall 126, while body 122 comprises a substantially cylindrical side wall 127, and gasket 124 is positioned between the side walls 126 and 127, to ensure the tightness of the lens structure.

The cap 120 and body 122 in this example form electrodes of the lens. Cap 120 is used to provide a voltage to the conducting liquid 108. Body 122 is used to provide a voltage close to the edge of the liquid-liquid interface 109. The edge of the liquid-liquid interface 109 contacts an insulated conical surface 126 of the annular body. The parts of body 122 in contact with the liquids 106, 108, including conical surface 126, are coated with an insulating layer (not shown). The interface 109 traversed an opening in the annual body 122 through which light rays can pass.

Due to the electrowetting effect, it is possible, by applying a voltage between the cap 120 and the body 122, to change the positioning of the edge of the liquid-liquid interface on the conical surface 126, and thereby change the curvature of the refractive interface between liquids 106 and 108. For example, the interface may be changed from initial concave shape shown by dashed line A, to a convex shape as shown by solid line B. In this way, rays of light passing through the lens perpendicular to windows 102, 104 in the region of the refractive interface A, B will be focused more or less depending on the voltage applied between the cap 120 and body 122.

In some applications, more complex control of parts of the liquid-liquid interface is needed, for example when image stabilization or when correction of optical aberrations is desirable. Conventionally, image stabilization consists in avoiding blur in images related to vibrations that can occur during the image capture, for example due to hand-shaking, by providing specific devices and/or image processing.

Figure 2:
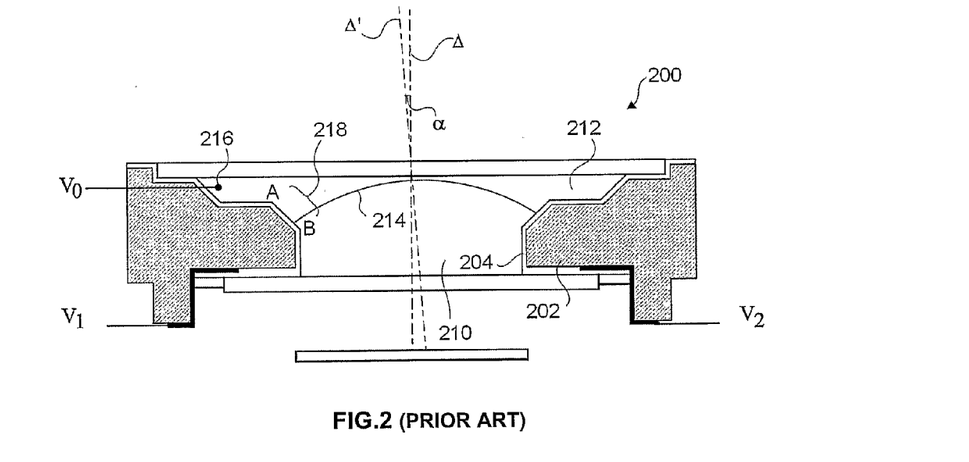
FIG. 2 (described above) is a cross-section view of a liquid lens according to the prior art.

A liquid lens allowing image stabilization has for example been proposed by the applicant in co-pending European application No EP07301180.1. FIG. 2 illustrates such a liquid lens where a refractive liquid-liquid interface 214 can be tilted when two different voltages V1 and V2 are applied between opposite sides of a resistive body 202 and an electrode 216 in contact with a conducting liquid 212. The tilt of the refractive interface 214 allows compensating the movement of the image capture device that includes such a liquid lens.

The present invention aims at providing an improvement of such optical electrowetting devices.

SUMMARY OF THE INVENTION

According to one aspect of the present invention, there is provided an optical electrowetting device comprising a body comprising at least a first external surface and a second internal surface with a conical shape; a liquid-liquid interface between a first and a second immiscible liquids, the first liquid being a conducting liquid and the second liquid being an insulating liquid, wherein the liquid-liquid interface is able to move on the second internal surface by electrowetting effect; a first electrode in contact with the first liquid; a second electrode insulated from the first liquid by an insulating layer, the second electrode comprising at least a first electrical conductive track to be connected to a voltage source and extending from the first external surface of the body to the second internal surface; and a first layer covering the second internal surface of the body and being covered by the insulating layer, wherein the shape of the liquid-liquid interface is controllable by application of at least a first voltage between the first electrode and the first electrical conductive track, and wherein at least one of the body or the first layer is made of a resistive material.

According to another embodiment of the present invention, the body is made of a resistive material.

According to another embodiment of the present invention, the body has a volume resistivity from $10^2$ to $10^6$ Ohm·cm.

According to another embodiment of the present invention, the body is made of a blend comprising an intrinsically conductive polymer.

According to another embodiment of the present invention, the body is made of a polymer charged with conductive particles.

According to another embodiment of the present invention, the body is made of a thermoplastic polymer.

According to another embodiment of the present invention, the body is made of a Liquid Crystal Polymer.

According to another embodiment of the present invention, the body is made of a thermosetting polymer.

According to another embodiment of the present invention, the body is made of an epoxy charged with conductive particles.

According to another embodiment of the present invention, the conductive particles are carbon nanotubes.

According to another embodiment of the present invention, the first layer is made of a resistive material.

According to another embodiment of the present invention, the first layer is made of an intrinsically conductive polymer.

According to another embodiment of the present invention, the first layer has a surface resistivity from 75 k$\Omega$ to 500 k$\Omega$.

According to another embodiment of the present invention, the first layer is made of PEDOT PSS.

According to another embodiment of the present invention, the first layer is made of an epoxy comprising conductive particles.

According to another embodiment of the present invention, the first layer is coated on the second internal surface of the body by spin coating.

According to another embodiment of the present invention, the first layer is made of a Nickel Chromium alloy.

According to another embodiment of the present invention, the first layer is made of a non conductive material.

According to another embodiment of the present invention, the first layer is made of an inorganic layer.

According to another embodiment of the present invention, the first layer is made of one of $SiO_2$, $Si_3N_4$, or $MgF_2$.

According to another embodiment of the present invention, the first layer is made of an organic layer.

According to another embodiment of the present invention, the at least first electrical conductive track is a thin film made of a conductive material, the conductive material being one of a metal, a conductive ink comprising metallic or carbon particles, Indium Tin Oxide, or a conductive polymer.

According to another embodiment of the present invention, the first layer is covering the at least first electrical conductive track.

According to another embodiment of the present invention, the first layer is made of PEDOT PSS and at least a part of the at least first electrical conductive track is made by locally irradiating the first layer with UV light to create at least one resistive region and the at least first conductive track.

According to another embodiment of the present invention, the second electrode comprises four electrical conductive tracks.

According to another embodiment of the present invention, the first layer has a thickness from 10 nm to 5 μm.

According to another embodiment of the present invention, the optical electrowetting device is or is included in a variable focal length lens, an optical zoom, an ophthalmic lens, a device having a variable tilt of the optical axis, an optical image stabilization device, a light beam deflector device, or a variable illumination device According to a further aspect of the present invention, there is provided an imaging system comprising an image sensor for capturing an image; a lens arrangement arranged to form an image on the image sensor, the lens arrangement comprising the above optical electrowetting device.

According to another aspect of the present invention, there is provided a digital camera comprising the above imaging system.

According to another aspect of the present invention, there is provided a mobile telephone comprising the above imaging system.

According to another aspect of the present invention, there is provided a method of manufacturing an optical electrowetting device comprising providing a body comprising at least a first external surface and a second internal surface with a conical shape; providing a liquid-liquid interface between a first and a second immiscible liquids, the first liquid being a conducting liquid and the second liquid being an insulating liquid, wherein said liquid-liquid interface is able to move on the second internal surface by electrowetting effect; providing a first electrode in contact with the first liquid; providing a second electrode insulated from the first liquid by an insulating layer, the second electrode comprising at least a first electrical conductive track to be connected to a voltage source and extending from the first external surface of the body to the second internal surface; and providing a first layer covering the second internal surface of the body and being covered by the insulating layer; wherein the shape of the liquid-liquid interface is controllable by application of at least a first voltage between the first electrode and the first electrical conductive track, and wherein at least one of the body or the first layer is made of a resistive material.

According to another embodiment of the present invention, the first layer is formed by spin coating and/or Ink Jet process.

According to another embodiment of the present invention, the first layer is formed by evaporation or sputtering.

According to another embodiment of the present invention, the first layer is formed by Chemical Vapor Deposition.

According to another embodiment of the present invention, the insulating layer is formed by Physical Vapor Deposition.

According to another embodiment of the present invention, the at least first electrical conductive track is formed by evaporation of a conductive material on the body through holes of a 3D physical mask.

According to another embodiment of the present invention, the at least first electrical conductive track is formed by locally irradiating by UV light the first layer being made of PEDOT PSS to create at least one resistive region and said at least first conductive track.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION OF THE INVENTION

In the present description and claims, the terms conductive and conductivity refers to electrical conductivity.

Figure 3A:
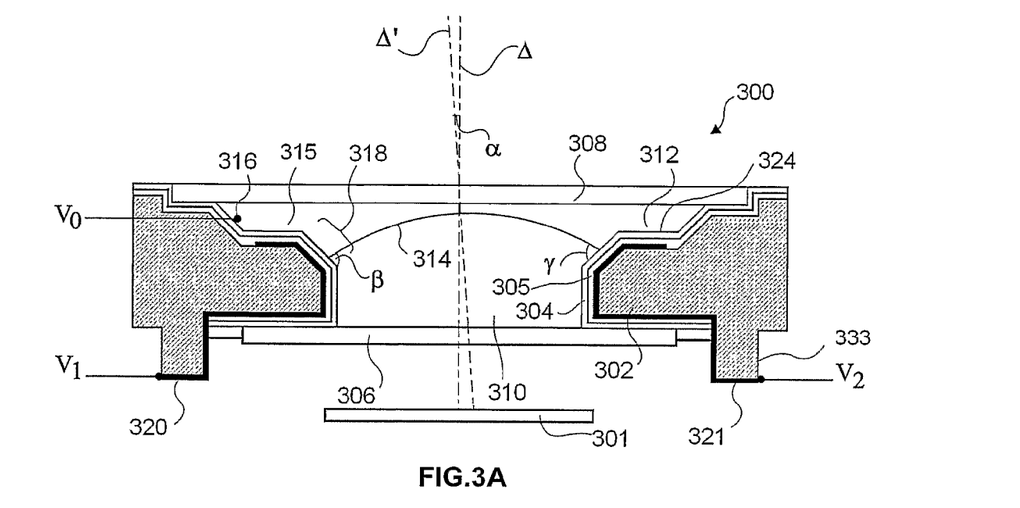
FIG. 3A is a cross-section view of a liquid lens according to a first embodiment of the invention and that illustrates the effect of tilt of the liquid-liquid interface.

FIG. 3A is a cross-section view schematically illustrating a liquid lens 300 according to a first embodiment of the present invention, and showing how a tilt and focus can be achieved by application of different voltages V1 and V2 to some electrical contact tracks 320 and 321.

Liquid lens 300 is mounted over an image sensor 301, for example with one or more fixed lenses positioned between the liquid lens 300 and the image sensor or at the front of the liquid lens 300 (fixed lenses not shown in FIG. 3A). Lens 300 comprises an annular body 302, conductive electrical contact tracks 320 and 321, a first layer 305 and a second insulating layer 304 covering its inner surface, such that the liquids in the lens are insulated from the electrical tracks.

The electrical insulating layer is for example a polymer, for example poly-para-xylylene linear polymers like Parylene C, N, D or AF4 (or Parylene HT developed by SCS company, or Parylene SF from Uniglobe Kisco Inc). Transparent windows or lenses 306, 308 are glued to an underside and a top side respectively of the annular body 302, sealing an electrical insulating liquid 310 and a electrical conducting liquid 312 in the lens. These liquids have different refractive indices, and form an optical interface 314 in the form of a meniscus where they meet. Liquid lens 300 has symmetry of revolution around a central axis orthogonal to windows 306, 308, and identical to the optical axis Δ defined by light rays entering the lens through the window 308.

In the example of FIG. 3A, the annular body 302 is a resistive body and comprises two conductive electrical contact tracks 320 and 321 such that when two different voltages V1 and V2 are applied to the contact tracks placed at opposite sides of the annular body, different voltages are generated close to the edge of interface 314 on each side of the lens, causing the liquid interface to tilt. The voltages are applied between the annular body 302 forming an electrode and another electrode 316 contacting the conducting liquid. A liquid lens with resistive body is for example discussed in more detail in co-pending European Application No 07301180.1, in the name of the present applicant and further details on the resistive material of the body and the conductive material of the tracks are given below.

The example is shown in which voltage V1 applied to electrical track 320 at the left-hand side of the body 302 is higher than voltage V2 applied to electrical track 321 at the right-hand side of the body. A voltage gradient is thus created around the symmetry axis Δ, varying from V1 to V2 in a continuous manner due to the resistive nature of the body 302. As illustrated, due to the electrowetting effect, the higher voltage V1 provided to electrical track 320 causes a larger displacement of the edge of the liquid interface 314 on the left hand side of the lens than the displacement on the right-hand side. The refractive interface 314 is tilted by an angle α to the normal optical axis Δ, defining a new optical axis Δ'.

Angle α is for example controllable in a range from 0-30° by the difference between V1 and V2. Angle α for a given cross-section of the lens can be determined approximately as half the difference in contact angle between the edge of the liquid interface 314 with conical surface 318 of the annular body 302 in contact with the liquid interface. Assuming a contact angle β between interface 314 and surface 318 in the region of voltage V1, and a contact angle γ between edge 314 and surface 318 in the region of voltage V2, angle α can be determined as approximately equal to (β−γ)/2. This represents the geometric tilt of a refractive interface. The effective optical tilt can be approximately determined as:

$$\text{Optical Tilt} = \text{Geometric Tilt} \cdot \Delta n$$

where Δn is the difference between refractive indices of the insulating liquid 310 and the conducting liquid 312.

Focusing of the lens, in other words the power of the lens resulting from the curvature of the interface 314, is controlled at the same time as the tilt of the lens. The power of the lens is at least dependent on the average of voltages V1 and V2, whereas the tilt is at least dependent on the difference between V1 and V2.

The resistive material forming the body 302 may be for example a conductive molded polymer material having a volume resistivity ranging from $10^2$ to $10^6$ Ohm·cm, and preferably from $5.10^3$ to $10^5$ Ohm·cm. This volume resistivity corresponds to a resistance between two contact tracks from 75 kOhm to 1 MOhm, and preferably 150 to 300 kOhm. Injection molding or other molding techniques like replication can be used to manufacture the body 302. Intrinsically conductive polymers (ICP) mixed with non intrinsically conductive polymers or other non intrinsically conductive polymers made conductive by mixing or implanting conductive particles or fibres can be used to form the body 302. Non intrinsically conductive polymers are for example, thermal plastic polymers, such as LCP (Liquid Crystal Polymer) like Ticona Vectra A725. Such materials have a Water Vapour Transmission (WVT) of less than 0.15 g·mm/m²·day (measured as per DIN 53122 part 2) allowing sufficient tightness for the purposes of containing the liquids 310, 312 in the internal volume 315 of the lens. More preferably, the WVT coefficient of the body 302 is less than 0.02 g·mm/m²·day. Other non intrinsically conductive polymers such as thermosetting polymers, for example epoxy, can also be used to form the body 302. They present good mechanical properties and have good chemical resistance and appropriate low WVT coefficients. By using fibres, such as carbon fibres, carbon nanotubes or fine metal wire, a mechanically strong composite can be formed, which is particular advantageous for forming bodies which are to be subject to mechanical stress, for example bodies to which a cap is crimped. A variant could be to use metal coated fibres, for example silver on glass. The use of particles mixed with the polymer to provide a conductive material is preferable in some cases as this can improve hermetic properties of the body 302. According to one example, a polymer with a carbon black additive could be used, produced by incomplete combustion of hydrocarbon vapours. Such a material includes polyethylene with black composite. Alternatively, for a better control of the conductivity of the body 302, a polymer mixed with metal particles, such as nickel or silver, could be used. Alternatively again, a polymer can be doped with conductive particles. An example is to use metallic organic charge transfer salts which have common solvents with the polymer host. Such a material is termed a reticulate doped polymer. Intrinsically conductive polymers refer to organic polymers which have (poly)-conjugated π-electron systems (e.g. double bonds, aromatic or heteroaromatic rings or triple bonds). Examples of such polymers are polydiacetylene, polyacetylene, (PAc), polypyrrole (PPy), polyaniline (PANI), polythiophene (PTh), polyisothionaphtalene (PITN), polyheteroarylenvynilene (PArV), in which the heteroarylene group can be the thiophene, furan, or pyrrole, poly-p-phenylene (PpP), polyphthalocyanine (PPhc), and the like, and their derivatives (formed for example from monomers substituted with side chains or group), their copolymers and their mixtures. Advantageously, blends of intrinsically conductive polymers with conventional processible thermoplastics or thermosetting polymers can be used. An example of such a blend is described in the United States patent of Kulkarni et al. U.S. Pat. No. 5,217,649, which is hereby incorporated by reference to the extend allowable by the law. This patent describes making conductive polymeric blends by mixing "doped" polyaniline and polyvinyl chloride, chlorinated polyethylene or other thermoplastic polymers, which exhibit high electrical conductivity.

The blend comprises an intrinsically conductive polymer, an insulating thermoplastic material and at least one additive selected from the group consisting of an impact modifier, an ester-free plasticizer and an acidic surfactant.

The electrical conductive tracks 320 and 321 may be thin films made of conductive material, for example metal like chromium and gold, copper, aluminium, or other conductive material such as conductive inks comprising metallic or carbon particles, ITO (Indium Tin Oxide) or conductive polymers such as those described above for the body 302 but having a higher conductivity than the body material. In some embodiments, the conductive tracks or parts of them located on the top side of the body are black in order to avoid undesirable light reflections in the optical device, for example by providing tracks formed of a three-part layer, a first part of chromium to adhere to the body, a second part of gold, and a third part of black chromium that will be in contact with the insulating layer 304. The tracks extend along the axis of symmetry Δ of the lens, from the foot 333 of the annular body 302 to an inner flat surface 324 orthogonal to the optical axis Δ and facing the transparent window 308. The tracks thus cover all the height of the conical part 318 of the body 302, along which the edge of the liquid-liquid interface 314 moves during the operation of the lens. In alternative embodiments, the tracks extend from the internal conical surface 318 to an exterior region of the body 302 without going through the central opening of the lens 300 through which light rays can pass.

In this embodiment, the voltages V1 and V2 applied at the foot of the annular body 302 are almost identical to the effective voltages at the edge of the liquid-liquid interface 314: the tilt voltage transfer rate, defined by the ratio between the effective voltage and the applied voltage, is made optimal, that is close to 100%, by providing conductive tracks that extend from an external surface of the body 302 to the internal conical surface 318. Advantageously the conductive tracks cover the entire conical surface height of the body 302 along which the edge of the liquid-liquid interface is likely to move. Compared with the liquid lens of the prior art mentioned above and illustrated in FIG. 2, the tilt transfer rate is greatly improved. In FIG. 2, the effective voltage in the body 202 at a given position on the conical surface 218 will be a reduced version of the applied voltage: it will depend on the magnitude of voltages V1 or V2, but also the distance from the given position to contact points where the voltages are applied, which are located on the underside part of the body. In particular, for a contact point positioned at equidistance from the upper part A and the lower part B of the conical surface 218, experimental data have shown that the tilt transfer rate is inferior to 40%.

Figure 3B:
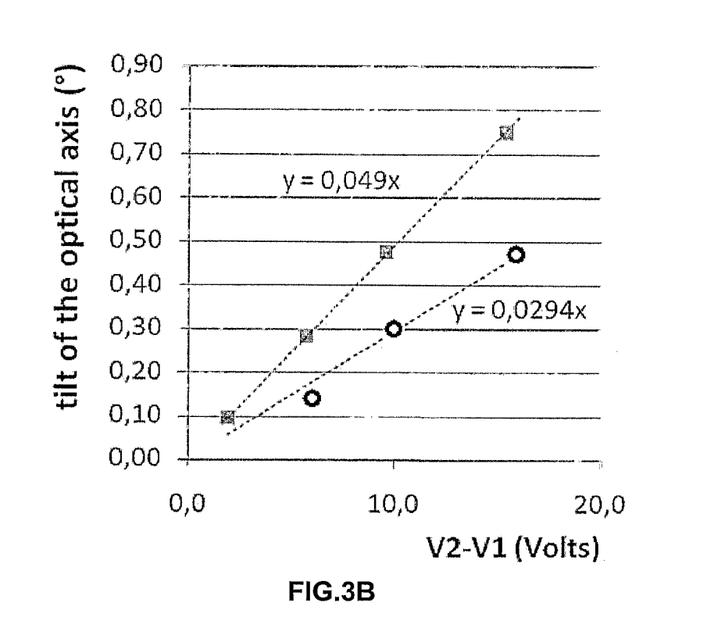
FIG. 3B is a graphical representation illustrating how the tilt transfer rate is estimated.

The tilt transfer rate is estimated using a measurement of the optical tilt generated by the liquid lens for given applied voltages. For a given applied voltage, the transfer rate is the ratio between the theoretical applied voltage that would result in said measured optical tilt and said applied voltage. FIG. 3B shows an example of tilt transfer rate calculation. In FIG. 3B, empty circles correspond to measurements of optical tilts for different applied voltages, in particular different bias voltages corresponding for example to differences between V1 and V2. A linear interpolation of these measurements gives a slope equal to 0.0294°/V. This value is compared to the value extrapolated from a simple theory, based on the electrowetting theory, which gives the dependence of the contact angles β and γ as illustrated in FIG. 3A with theoretical applied voltage given by the classical electrowetting formulas:

$$\cos\beta = \cos\beta_0 - \frac{1}{2}\frac{\varepsilon \cdot \varepsilon_0}{e \cdot \gamma_\parallel} \cdot V_1^2 \text{ and } \cos\gamma = \cos\gamma_0 - \frac{1}{2}\frac{\varepsilon \cdot \varepsilon_0}{e \cdot \gamma_\parallel} \cdot V_2^2$$

where $\beta_0$ and $\gamma_0$ are the contact angles at 0 voltage, $\varepsilon$ and $e$ are respectively the dielectric constant and thickness of the dielectric layer, and $\gamma_\parallel$ is the liquid-liquid interfacial tension. This model leads to the line plotted with squares on FIG. 3B having a slope equal to 0.049°/V. The tilt transfer rate is given by the ratio between the two slopes, which is equal to about 60% in this example.

The specific geometrical design of the conductive tracks described in the present invention thus provides a lens 300 allowing a precise control of the interface deformation as no tilt transfer rate has to be taken into account when determining the levels of voltages to be applied in order to get a desired value of tilt and focus. It also provides a lens 300 allowing optimizing the power consumption of the lens as the effective voltages are substantially identical to the applied voltages allowing to use lower voltages.

In alternative embodiments, the body 302 is composed of two parts. A first annular part comprises the upper conical part of the body in contact with the liquid-liquid interface and is made of a conductive molded polymer material, for example one of those previously described. This first part and the conductive tracks plays the role of an electrode of the optical electrowetting device. The second part is formed of a non conductive polymer, for example a non charged thermo plastic polymers like LCP or non charged thermosetting polymers like epoxy. By using insulating fibres, for example glass fibres, a mechanically strong composite can be formed, which is particular advantageous for forming bodies which are to be subject to mechanical stress, for example bodies to which a cap is crimped.

While in this example the tilt of the interface 314 has been described in a single direction, in alternative embodiments, tilt is done along two orthogonal directions defined by four conductive tracks equally spaced on the conical surface.

Figure 4A:
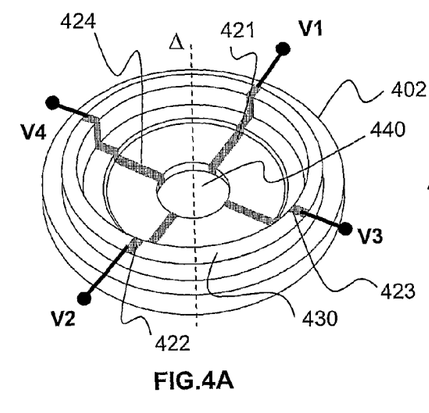
FIGS. 4A and 4B are 3D views of the top side and underside of a liquid lens according to one embodiment of the invention.
Figure 4B:
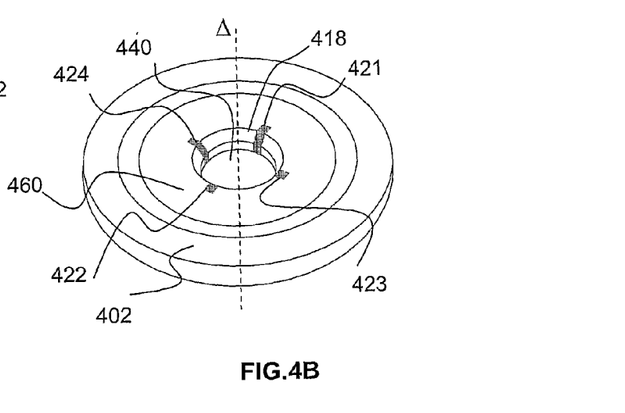

FIGS. 4A and 4B are elevated views of the underside and top side respectively of a resistive annular body 402 forming an electrode of the lens, and for example being made of a resistive material such as those described in the first embodiment of FIG. 3A. Four conductive electrical contact tracks 421 to 424 are provided on the surface of the annular body 402, and are equally spaced around it. As illustrated each contact track corresponds to a thin layer of conductive material, for example less than 300 nm thick, that extends in a radial manner inward the central opening 440, from the annular foot 430 of underside of the body 402 to the flat surface 460 of the top side of the body, such that it covers all the height of the conical surface 418. The distance separating each contact track is greater than the width of each contact track. Preferably, the contact tracks are straight narrow strips, for example 200-500 μm wide. The width of the contact tracks can vary and depends on the size of the aperture of the lens.

In this example, four voltages V1 to V4 are applied to the contact tracks 421 to 424 respectively, such that when V1, V2, V3 and V4 are different from each other, the almost identical voltage levels are present at the inner edge of the annular body 402 and deformation of the liquid-liquid interface occurs according to the electrowetting phenomenon. Tilt according to two directions defined by contact tracks 421 and 422 in one hand and contact tracks 423 and 424 in another hand can for example be achieved. In this case higher voltage levels are applied at two adjacent contact tracks.

FIGS. 4C, 4D and 4E, 4F illustrate two further embodiments according to the invention, and also correspond to elevated views of the underside and top side respectively of a similar resistive annular body 402. Similar reference numbers have been given to equivalent features throughout the FIGS. 4A to 4F.

Figure 4C:
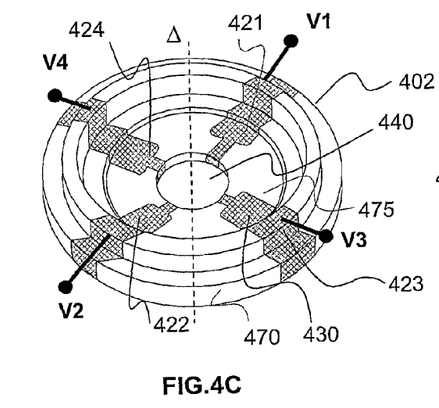
FIGS. 4C and 4D are 3D views of the top side and underside of a liquid lens according to another embodiment of the invention. 4E and 4F are 3D views of the top side and underside of a liquid lens according to further embodiment of the invention.
Figure 4D:
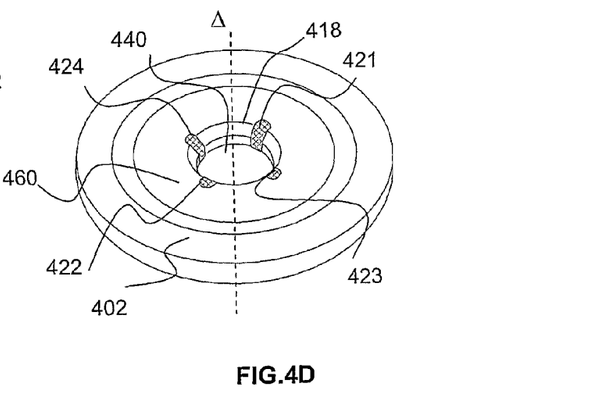

In FIGS. 4C and 4D, the four conductive tracks differ from the design shown in FIGS. 4A and 4B in that the four identical tracks 421 to 424 have a variable width according to a radial direction from the annular foot 430 of underside of the body 402 to the flat surface 460 of the top side of the body. In particular, tracks are formed by two parts of different width: a first part, extending from the foot 430 to a region of a flat surface 475 of the underside of the body wider than a second part extending from the same region on the flat surface 475 to the flat surface 460 of the top side of the body. Typically, the first part may be about 1 mm wide, whereas the second part is for example 200-500 μm wide. Thickness of the tracks is constant and is for example less than 400 nm thick. The first and second parts of each conductive track may be continuous, and their respective surfaces may cover a variable surface of the body 402. In the FIG. 4C for example, the first part is covering the external surface of the body from a cylindrical side wall 470 of the body 402 to a region close to the central opening on the external flat surface 475 of the body, passing though the foot 430 of the body where the electrical contact with a driving circuitry is done. The narrowest second part extends from this region to the flat surface 460 of the top side of the body, such that it covers all the height of the conical surface 418. One advantage of this embodiment is that the wider part of the conductive tracks allow ensuring that the electrical contact is maintained even if some lateral variations of the surface occur related to the geometry of the underside part of the body exist, for example due to the steps formed by the foot of the body or by the region supporting the window referenced 306 on FIG. 3. It thus allows more reliable liquid lenses, by for example compensating shape defects that may deteriorate the conductive tracks formed on the surface and leading to electrical contact issues such as micro electrical cut-off. If such an embodiment undergoes mechanical stress, inducing defects on the body surface, wide conductive tracks as described in this embodiment are statistically more likely to remain conductive.

Figure 4E:
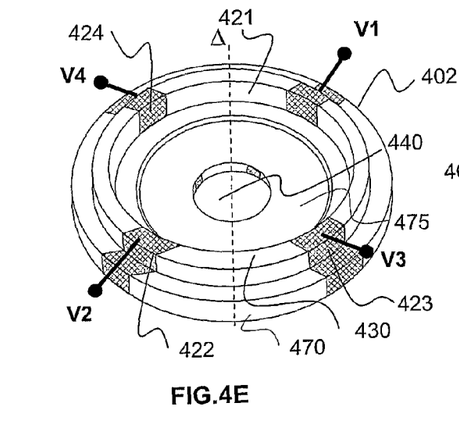
Figure 4F:
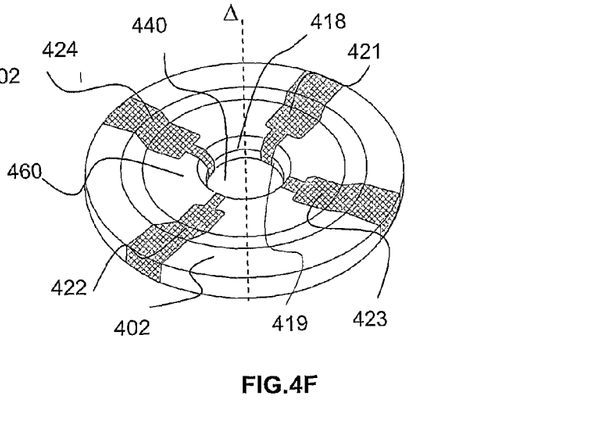

FIGS. 4E and 4F illustrate another embodiment according to the invention. In this example, the conductive tracks extend from an external surface of the body 402 to the internal conical surface 418 without going through the central opening 440, in particular the electrical path mainly being on the top side of the annular body. In FIGS. 4E and 4F, the conductive tracks extend from the annular foot 430 of the body radially outwardly to the internal surface of the body by passing through the cylindrical side wall 470. The tracks cover the entire height of the conical surface 418 and may end, as illustrated on the FIGS. 4E and 4F at the junction between the internal cylindrical surface and the external surface 475 of the body 402. Forming the tracks this way may be advantageous for example when the underside of the body 402 presents too many steps, or when the underside of the body 402 presents defects related to the moulding process.

Configuration of conductive tracks described in FIG. 3 may be substituted by the configuration of conductive tracks described above in relation to FIGS. 4A to 4F, the method of operation of the liquid lens remaining largely similar.

The four contact tracks may also allow achieving other type of optical interface deformations, such as astigmatism, or allow correction of astigmatism while allowing tilting and/or radius curvature deformation of the optical interface. Astigmatism can be provided by applying higher voltages to contact tracks being at opposite sides of the body, for example 421 and 422, than voltages applied to the other two opposing contact tracks, for example 423 and 424. Astigmatism is characterized by a difference of curvature radii of the interface in two orthogonal directions.

It will be apparent that the idea of providing multiple electrodes to give variable tilt or astigmatism to the optical interface can be extended to any number of contact tracks with the annular body. Increasing the number of contact tracks allow a more complex control of the liquid-liquid interface.

The first layer 305 between the insulating layer and the tracks is preferably made of an inorganic or organic thin film that will make a physical and chemical homogenization of the surface of the bodycone on which the tracks are arranged, enabling a conformal deposition of the thin layer, for example the parylene coating. The film may be inorganic ($SiO_2$, $Si_3N_4$, $MgF_2$ or other dielectric thin film) or organic (epoxy resin SU8, Poly Vinyl Phenol PVP etc. . . . ) and is thin enough not to contribute to the electrical capacitance of the insulating layer. Typically, the first layer has a surface capacitance much larger than surface capacitance of the insulating layer, typically 10 times larger, or the first layer is 10 times thinner than the insulating layer. For example, the thickness of the first layer is between 10 nm and 500 nm, more preferably between 50 nm and 300 nm, and more preferably from 50 nm to 150 nm. Such thickness also allows providing a low stressed film.

According to a further embodiment, the annular body 302 is made of an insulating material, for example an insulating polymer material like LCP. Insulating fibres, such as glass fibres can be introduced in the polymer to form a composite polymer having reinforced mechanical resistance properties, which is particular advantageous for forming bodies which are to be subject to mechanical stress, for example bodies to which a cap is crimped. The annular body can be injection molded or machined. In alternative embodiments, the annular body 302 can be formed of ceramic, or a metal made insulating by an anodization process.

In this embodiment, the insulating annular body 302 is covered with a resistive layer 305, for example made of a conductive polymer having a surface resistivity between 1Ω and 10 MΩ, and preferably between 75 kΩ and 500 kΩ. Surface resistivity is defined for a resistive film of thickness e and volume resistivity ρ as the ratio ρ/e between volume resistivity and thickness of said material. The resistive layer 305 can be formed by, evaporation, sputtering, PVD (Physical Vapor Deposition), Chemical Vapor Deposition (CVD), spin-coating, Ink Jet or dip-coating processes where a polymer solution is used to form a polymer film after solvent evaporation. Typically, the first layer 305 has a thickness from 10 nm to a few μm, for example 5 μm, more preferably between 10 nm and 1 μm, and more preferably from 50 nm to 1 μm.

The conductive electrical contact tracks 320, 321 are lying under the resistive layer 305, and cover the entire height of the conical part 318 of the body where the edge of the liquid-liquid interface is likely to move. The position of the contact tracks on the body is similar to FIGS. 4A and 4B, and extend from the annular foot 333 to a region inside the lens in contact exclusively with the conducting liquid, for example a flat region 324 orthogonal to axis Δ and located above the conical part 318.

In this embodiment, the principle of operation of the lens is similar to what has been described for the first embodiment, and the voltage tilt transfer rate is substantially equal to 100% thanks to the design of the electrical circuitry formed by the conductive tracks on the body 302.

The second electrode, by reference to the first electrode in contact with the conductive liquid of the liquid lens, comprises the conductive tracks and the resistive layer 305. The second electrode is covered with the insulating layer 304 that has suitable dielectric and hydrophobic properties for providing a reliable liquid lens showing a good optical performance. Reliability is the ability for the device to keep its initial physical properties after a set of tests. For a liquid lens device for example, reliability is evaluated with the measurements of the hysteresis, wave front error or stability of the driving voltage. Usually these tests include storage of the device at elevated temperature and a functional test in which a cycling voltage is applied to the embodiment to mimic an actual application, The applied voltage is either use to induce an optical power, a tilt variation or both. We refer this test as On/Off, because it usually implies to turn the applied voltage on and off several thousands or millions of times.

The insulating layer 304 is for example a polymer, such as poly-para-xylylene linear polymers like Parylene C, N, D or AF4 (or parylene HT from SCS company or Parylene SF from Uniglobe Kisco Inc) or a stacking of those Parylene polymers. These polymers are intrinsically hydrophobic insulators. Poly-para-xylylene linear polymers can be produced by vaporization of the dimer di-para-xylylene at 150° C., pyrolization of the dimer gas into a monomer of para-xylylene at 650-680° C., condensation and polymerization at room temperature (20-25° C.) as a transparent polymer film. Examples include Parylene C obtained as described above, Parylene N that is similar to Parylene C except that a chlorine atom is substituted by a hydrogen atom, Parylene D is similar to Parylene C but with 2 Chlorine atoms on the aromatic ring, and Parylene HT that is similar to Parylene N except that methyl group are replaced by fluorinated methyl groups. Deposition method is similar to Parylene C except temperature conditions. More details on the deposition method of these kind of layers in liquid lenses, generally corresponding to CVD (Chemical Vapor Deposition) process, or more precisely VDP (Vapor Deposition Polymerization process) process, can be found in international patent application No WO2008110560 in the name of the Applicant.

Such kind of polymers (Parylene) are particularly interesting for electrowetting device application because they are coated on a substrate by VDP (Vapor Deposition Polymerization) and gives a very conformal coating (same thickness all over an even complex geometry shape like a 3D shape body-cone for example). The Parylene polymer has a high electrical breakdown field Ebd (Ebd>200 V/microns). In a liquid lens, the thickness range for Parylene is typically between 1 microns and 10 microns. For a 40 V working voltage liquid lens, the preferred thickness is comprised between about 3 microns and 5 microns, taking into account that the working voltage of the liquid lens is depending on the liquid-liquid interfacial tension. The insulating layer 304 is a hydrophobic insulator film allowing a suitable contact angle, for example comprised between above 0° and 20°, and low contact angle hysteresis for a performing electrowetting-based liquid lens. It is also chemically inert and stable in order to ensure reproducibility and a long lifetime of the electrowetting device.

Contact angle refers in the present description to the natural contact angle defined by the angle formed between the tangent to a planar substrate on which a drop of a non-conductive liquid is placed and the tangent to the surface of the non-conductive liquid, both measured at the point of the triple interface, when no voltage is applied. As it appears from the present specification, the substrate in the electrowetting liquid lens is not planar and presents a recess to center the non-conductive liquid in the lens. However, the natural contact angle according to the invention is the contact angle measured on a planar substrate made of the same material of the final device, with one liquid centered on the substrate and the other conductive liquid placed above. The raw natural contact angle may be measured at room temperature, say between about 20 and about 25° C., or at various temperatures within the operational and storage temperature range comprised between about −20° C. and about 70° C.

Application of a voltage to the conductive fluid favours the wettability of the substrate by the conductive liquid. This leads to a deformation of the triple interface with changes of the contact angle of the non-conductive fluid, with respect to the substrate and of the radius of curvature of the fluid-fluid interface, and finally of the focal length.

Contact angle hysteresis may be regarded as the difference of contact angle of the non-conductive liquid on the substrate at a given voltage value between the increasing voltage ramp and the decreasing voltage ramp. Contact angle hysteresis is related to the focal hysteresis, meaning that the optical power of an electrowetting liquid lens differ depending on voltage ramp direction, increasing or decreasing. In other words, the focal length of the liquid lens at a given voltage value may be different depending on whether the tension is increasing or decreasing and the interface between the conductive and the non-conductive liquids is moving towards or inwards with respect to the drop central axis. It has been found that a degradation of the optical quality is associated with such a hysteresis.

Figure 8:
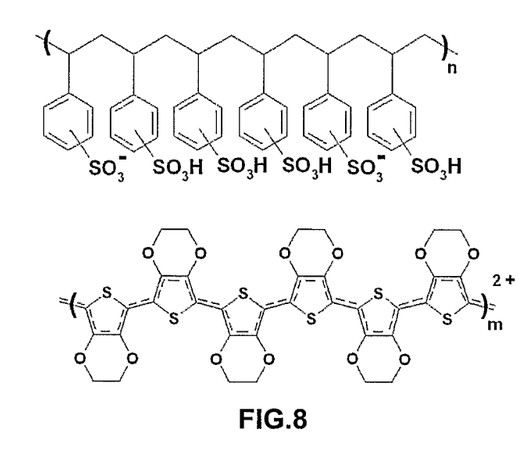
FIG. 8 illustrates the chemical formula of the material PEDOT PSS used as the first layer in one embodiment according to the invention.

Layer 305, which forms in this example a part of the second electrode with the conductive tracks, is preferably made of a resistive material such as intrinsically conductive polymers (ICP) such as those described above in relation to the first embodiment of FIG. 3A. More preferably, the layer 305 is made of Poly(3,4-ethylenedioxythiophene) poly(styrenesulfonate), also called PEDOT PSS, commercially available from H.C Starck under the name Clevios™ or from Sigma-Aldrich for example. PEDOT PSS is a transparent polymer mixture of PEDOT and PSS. A chemical structure of the PEDOT PSS is given in FIG. 8.

The PEDOT PSS is an intrinsically conductive polymer with electrical resistivity going from $10^{-2}$ Ohm·cm to $10^8$ Ohm·cm giving access to a wide range of resistivity.

The inventors have shown that one advantage of ICP (Intrinsic conductive polymer) coating compared to other electrically resistive materials is that it strongly reduces optical aberrations. In the case of a body with 4 electrodes, the optical aberration (expressed in a Zernick polynomial decomposition) has been shown to be tetrafoil. The inventors have found that such a layer allows providing very performing liquid lens with a low focal length hysteresis and low optical aberrations.

Figure 5A:
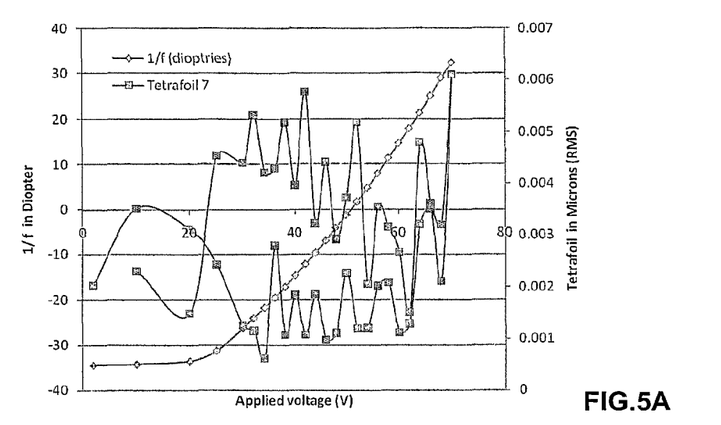
FIGS. 5A to 5C are graphical representation showing the contact angle hysteresis and the tetrafoil optical aberration for a liquid lens according two embodiments according to the invention (FIGS. 5a and 5B) and a comparative example (FIG. 5C).
Figure 5B:
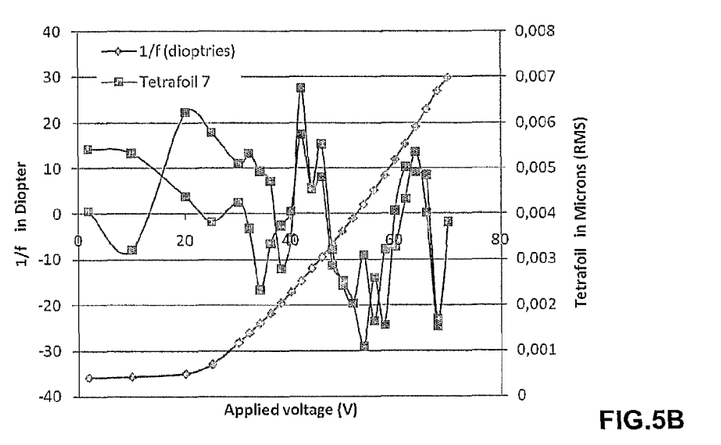
Figure 5C:
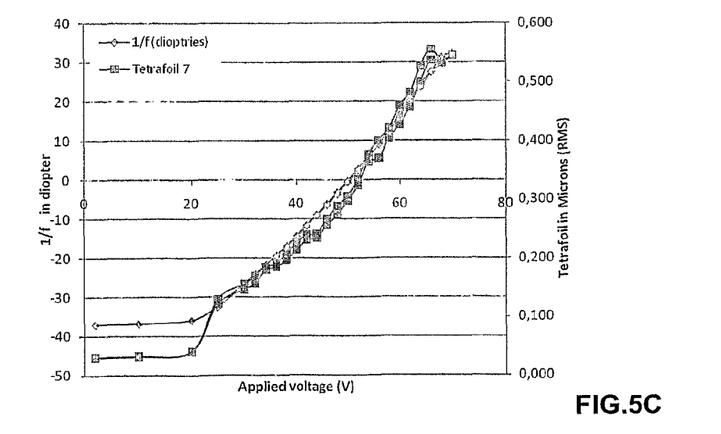

FIGS. 5A to 5C show the measured 1/f, where f is the focal length of the liquid lens (in dioptrie or $m^{-1}$) and the measured tetrafoil, as a function of the applied voltage when the liquid lens comprises an insulating body with a PEDOT PSS resistive layer (FIG. 5A), and when the liquid lens comprises a resistive body with a PEDOT PSS resistive layer. FIG. 5C shows a comparative example wherein the liquid lens comprises a bulk resistive body made of LCP charged with carbon nanotubes, and with no first layer. The liquid lens in the three embodiments comprises four conductive tracks. Tetrafoil and focal length measurements are done while applying an increasing voltage and then a decreasing voltage. The tetrafoil optical aberration is measured by a Shack Hartmann wave front analyser and is the main optical aberration in a four-fold symmetry system due to the four electrodes. FIGS. 5A to 5C show that tetrafoil optical aberration is at least 100 times better in embodiments according to our invention (FIGS. 5A and 5B) than in the comparative example. The focal length hysteresis is very low in FIGS. 5A and 5B, as well as in FIG. 5C, showing that embodiments according to the invention are well suited to performing liquid lenses.

Advantageously, the layer 305 allows homogenizing the physical and chemical properties of the surface formed by the assembly of the conductive tracks and the conical surface of the body 302, on which the liquid-liquid interface of the liquid lens is likely to move. The physical and chemical properties to homogenize include roughness, surface energy, polarity, and resistivity if the material is resistive. The homogenizing of the surface enables a conformal deposition of the insulating layer 304. For example, in the case of an insulating layer made of parylene, the speed growth of parylene is similar on each point of the underlying surface, and thus allows avoiding problems of thickness variation of the final parylene layer that would involve locally differentials in the electrically capacitance and thus involve optical aberrations.

One further advantage of using such a layer 305 is related to the planarization effect of the underlying surface. The surface planarization limits the optical aberrations that could be created by the electrode structure on the surface. The planarization of the surface may have a strong impact on the reliability, since it will decrease the breakdown voltage due to pic roughness.

Advantageously, the layer 305 is provided using a spin coating process and/or ink Jet process. It provides a good homogeneity of the conductivity all along the resistive layer, and thus all along the conical surface of the liquid lens wherein the liquid-liquid interface is to move. Indeed, spin and/or Ink Jet coating enable to make a very controlled thin film layer in the slope of the bodycone with a very homogenous resistivity and surface resistance due to a homogeneous thickness around a circumference of the slope of the bodycone. The applicant has shown that the difference of resistance between two diametrically opposed electrodes on an insulating bodycone with a thin film of PEDOT PSS (CPP105 D grade from HC Starck for example) may be less than 1 kOhm for a resistance value of 150 kOhm target.

Although ICP materials and among them PEDOT PSS have been shown to give very good results for the liquid lens when used for the resistive layer 305, other materials may be used for the resistive layer 305. For example, non intrinsically conductive polymers may be used, made conductive by mixing or implanting conductive particles or fibres. For example, epoxy comprising conductive particles such as carbon nanotubes, black carbon, or other conductive particles, coated by spin coating and/or Ink Jet may be used. Other material such as a Nickel Chromium (NiCr) alloy could also be used as a resistive material for the first layer. These materials are thermally stable with a low variation of the resistivity in function of the temperature and may be applied by evaporation or sputtering, applicable in mass production process In an alternative embodiment, both the layer 305 and the body 302 may be made of a resistive material. According to such embodiment, the second electrode insulated from the liquids is formed by the assembly of the resistive body, the conductive tracks, and the resistive layer. Advantageously, the resistive layer and the resistive body are chosen such as the resistance measured between two adjacent conducting tracks is comprised between 150 kΩ and 1 MΩ. This implies that contribution R1 from the resistive body and contribution R2 from the resistive layer are related such as $$150 k\Omega < \frac{R_1 R_2}{R_1 + R_2} < 1 M\Omega$$

with $1/1000 < R_1/R_2 < 1000$ and more advantageously $1/100 < R_1/R_2 < 100$. This embodiment advantageously prevents local lack of homogeneity in resistivity in the close vicinity of the insulating layer. The use of two complementary layers improves the resistance reliability as it decreases the failure probability.

In an alternative embodiment, the resistive layer 305 and conducting tracks are made in the same material, for example PEDOT PSS polymer as said polymer is being known to undergo a permanent resistivity increase under UV irradiation. The said layer in the present embodiment is irradiated with UV light in order to locally modify the layer resistivity. The UV irradiation is patterned according to FIG. 4B, 4D or 4F. According to FIG. 4B, UV is blocked on areas 421, 422, 423 and 424 in order to leave the PEDOT PSS layer conductive, and UV irradiation is made moderately on the conical recess 418 in order to obtain a resistance between two non irradiated conductive tracks between 150 kΩ and 1 MΩ. On area 402, i.e. between the conical recess and the outer diameter of the body, UV irradiation is performed such as surface resistivity is as high as possible, for example above 2 MΩ. One advantage of the embodiment is to replace two materials i.e. conductive tracks and the resistive layer by only one, limiting adhesion compatibility issues as well as reducing chemical in-homogeneity at the outer interface, smoothing surface, reducing cost, and simplifying process. In such an embodiment, the conductive tracks may be formed in two parts; One part is covering at least the conical surface of the body and forms a single layer with the first layer. Another part, for example lying on the backside of the body and connected to the voltage source, may be formed of conductive material such as metal like chromium and gold, copper, aluminium, or other conductive material such as conductive inks comprising metallic or carbon particles, ITO (Indium Tin Oxide) or conductive polymers such as those described above for the body 302 but having a higher conductivity than the body material. In another embodiment, back side of the body as described in FIGS. 4A, 4C and 4E is covered with an additional layer of PEDOT PSS polymer and said layer is patterned with UV irradiation such as regions 421, 422, 423, and 424 remain non irradiated and thus conductive whereas surface outside the said regions are irradiated such as surface resistivity increases above 2 MΩ. One advantage of the present embodiment is to replace conductive tracks usually patterned with a physical mask by a single layer, potentially easier to process and patterned with an optical mask which simplifies the tooling and reduce the process cost.

The various designs of electrical conductive tracks shown in FIGS. 4A to 4F can be used in the different embodiments described above.

Figure 6A:
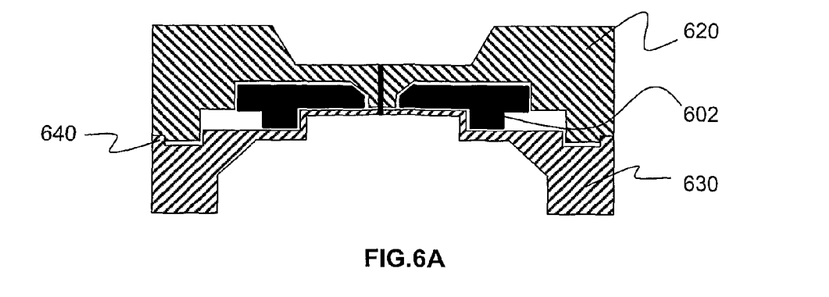
FIG. 6A to 6C are a cross-section and planar views of the tool used to create the electrical contact circuitry on the body of a lens according to the invention.
Figure 6B:
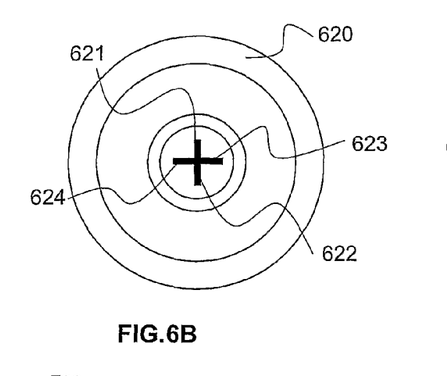
Figure 6C:
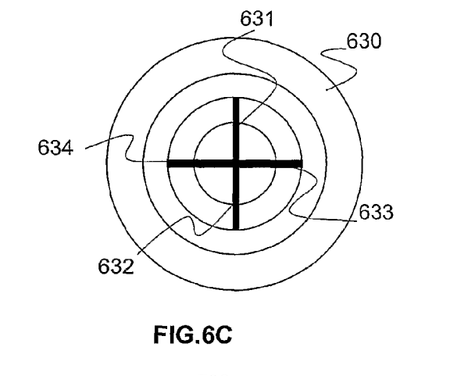

FIGS. 6A to 6C illustrates a method used to form the electrical conductive contact tracks. FIG. 6A is a cross section of the body and a tool used to make the contact tracks forming a three dimensional (3D) electrical circuitry on the body 602, using evaporation, sputtering or Ion Beam Assisted Deposition (IBAD) processes. The tool corresponds to a 3D physical mask comprising two annular parts 620 and 630 that can be nested, and having symmetry of revolution around a common axis. Each part comprises apertures forming a cross centred on the axis of symmetry, the branches 620 to 624 of the cross having a fixed width and length. While width is the same for the two parts 620 and 630, the length is greater for branches of part 630. The two parts 620 and 630 form a box enclosing the annular body 602 of the liquid lens. In some embodiments, the width of the peripheral part of branches 631 to 633 of the body 602 is larger than the rest of branches, This will provide larger conductive tracks on the foot of the body 602 allowing an easier connexion between the conductive tracks and a driver circuitry that will provide the voltages (not shown). The conical part of the body 602 is not in contact with part 620 to avoid any deterioration of the surface that will be in contact with the liquid-liquid interface and which could degrade optical properties of the lens. Each branch 620 to 624 of the cross corresponds to a passage or hole through which deposition of metal is made. Preferably, a rotative evaporator is used when metal deposition is done by evaporation or IBAD techniques. The alignment of the two parts 620 and 630 of the box is performed by pin guides 640 provided on different positions at the interface between parts 620 and 630. An accurate alignment of parts 620 and 630 allows contact tracks formed on the top side and underside of the body 602 through the passages 621 to 624 and 631 to 634 to be aligned and continuous.

In alternative embodiments, the 3D electrical circuitry can be formed by other techniques like overmoulding, two shot injection moulding, Moulded Interconnect Device (MID) or conductive inkjet. Overmoulding consists in injection molding of a plastic material around the contact tracks that have been for example previously machined. Two shot injection moulding consists in the injection of two different polymers to build the body and the contact tracks. For example, a first highly conductive polymer could be used to form the conductive tracks and a second less conductive polymer could be then be injected to form the bulk resistive body. In the case of a MID process, the 3D electrical circuitry could be done using first an injection molded polymer material, for example containing platinum. A laser activation of the polymer material is then done allowing designing a 3D circuitry that is further metalized in a chemical metallization bath in order to provide conductive tracks. Conductive inkjet process is similar to what is used for inkjet printer, except that the projected ink is conductive.

It is to be understood that method and apparatus for forming the conductive tracks can be adapted with the common knowledge of the skilled man to the various designs described in FIGS. 4A to 4F, and may also be adapted to further equivalents designs of conductive tracks.

Figure 7:
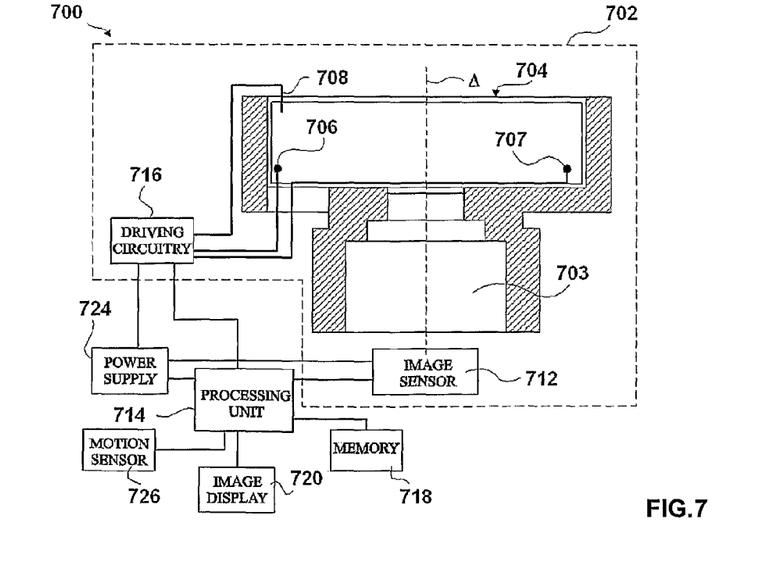
FIG. 7 is a schematic illustration of an optical apparatus according to an embodiment of the present invention.

FIG. 7 a schematic view of an optical apparatus 700 including an optical device according to embodiments of the invention, which is for example to be used in a compact digital camera, mobile phone, or alternative electronic device. Optical apparatus 700 comprises a camera module 702 comprising a lens arrangement 703 and an optical electrowetting device 704 according to one of the embodiments described herein. Optical device 704 has at least two separate contact tracks 706 and 707 for connecting voltages to a body of the lens (not shown), although, any number of contact tracks could be provided. At least one further electrode 708 is provided for making contact with the conducting liquid in the lens. The lens arrangement 703 comprises a number of fixed lenses.

Driving circuitry 716 is provided connected to the contact tracks 706, 707 and electrode 708. The driving circuitry 716 generates oscillating voltage signals to each of the electrodes.

The driving circuitry 716 for example comprises one or more frequency oscillators for generating signals at one or more given frequencies. These signals can then be amplified before being provided between contacts 706 and/or 707 and electrode 708.

As described above, the voltages applied between electrode 708 and the body electrode contact tracks 706, 707 can have different voltage levels or RMS values. This can for example be achieved by providing a variable resistor connected in series between the voltage signal and each of the contact tracks on the electrode, so that the peak to peak voltage level can be varied independently, for example from 0V to 140V. Alternatively, identical voltage signals having the same peak to peak voltage value, the same period and the same RMS voltage can be applied to the electrodes at the same time, but a variable delay can be added to the signal applied to each of the contact tracks 706, 707. In this way, the RMS voltage can be varied anywhere between 0V, when the signals applied to electrode 808 and one of the contact tracks 706, 707 are exactly in phase, and a maximum value when the voltage signals are exactly 180 degrees out of phase of 70V RMS. Such delays can for example be provided by capacitors.

As a further alternative, the RMS voltage of the signal to each of the contacts 706, 707 can be varied by varying the duty cycle of each of these signals, while providing either 0V or a signal having a constant duty circle to the electrode 708, to give RMS voltages variable between 0 and 70 V.

In an alternative embodiment, each of the contacts 706, 707 is supplied in turn with an AC voltage signal. The time during which the voltage signal is applied is varied for each contact track so that the required voltage is applied. The time period during which the contact tracks 706, 707 are not connected to the AC voltage signal is preferably shorter than the response time of a liquid-liquid interface so that there is no undesired movement of interface. As an alternative, the signal frequency can be increased or decreased, for example by applying only selected pulses of the referenced oscillating signal, resulting in a varied RMS voltage output.

The camera module 702 further comprises an image sensor 712 which captures images formed from light rays received by optical electrowetting device 704 and fixed lenses 803.

A processing unit 714 is provided in the optical apparatus 700, which is for example an image signal processor or a base band processor of a mobile phone. Processing unit 714 implements algorithms for controlling the driving circuitry 716, and also controls image sensor 712 to capture images. Processing unit 714 receives captured images from image sensor 712 and stores them in a memory 718 and/or displays them on a display 720.

A power supply unit 724 provides supply voltages to the driving circuitry 716, the image sensor 712 and the processing unit 714

In some embodiments, the optical electrowetting device 704 is a lens able to perform variable tilt, and such a function can be used to compensate for any movement of the optical apparatus 700 as an image is captured, which can cause blurring. In order to detect any movement of the apparatus, a motion sensor 726 can be provided in some embodiments, connected to the processing unit 714, or directly to the driving circuitry 716. Motion sensor 726 detects any motion, and generates an output signal to control the extent of tilt of a refractive interface of the optical electrowetting device 704 in response. In this example, movement of the apparatus around one axis can be compensated by the tilt of the refractive interface of the lens 704 using the two contact tracks 706 and 707. In alternative embodiments, movement of the apparatus around other axis could be detected by the motion detector, and corresponding additional electrodes provided in the liquid lens to control the tilt of the lens in response to the motion. Motion sensor 726 can comprise any suitable means for detecting motion of the apparatus, such as a micro-electro-mechanical system (MEMS) accelerometer, or gyroscope.

Alternatively, motion can be detected by detecting movement of the images sensed by the image sensor.

The optical device 704 is orientated in the camera module 702 thanks to positioning features (not shown), such as pins formed on the annular foot of the optical device body. These features allow electrical contacts to be always positioned in the same manner relatively to the motion sensor.

In some embodiments, a calibration loop is provided to calibrate the tilt before a picture is taken. In particular, while an image is being previewed, and before a final image is taken, motion can be detected for example using the motion sensor 726, the image can be tilted in response to account for the motion, and the image from the image sensor can be used to determine if the correct tilt was applied based on the motion. In particular, if too much or too little tilt was provided, this information can be used to recalibrate the tilt applied for a given movement for future movements. Calibration can be repeated several times such that when a picture is taken, the motion detection is calibrated.

Having thus described several illustrative embodiments of the invention, various alterations, modifications and improvements will readily occur to those skilled in the art.

For example, while embodiments have been described with two and four contact tracks on the annular body of the lens for providing different voltages, any number of contact tracks could be provided, depending on the required control of liquid-liquid interface. The contact tracks are preferably evenly spaced around the annular body, at equal distances on the conical surface 318.

While linear conductive tracks have been described in the conical region of the lens body, meaning strips of constant width, other different patterns for conductive tracks can be advantageously used: for example width of strips can vary along the generatrix of the cone. For instance a decreasing width of the conductive tracks towards the region of the cone having a smaller diameter can provide an additional centering mean for the liquid drop.

Any feature described in relation to one embodiment may be used alone or in combination with other features described, an may be also used in combination with one or more features of any other of the embodiments, or any combination of any other of the embodiments.

While having described several embodiments of the optical electrowetting device, the present invention could also be applied to other embodiments, for example as those described in patent application No US 2007/0002455 or in patent application No US 2006/126190, which are hereby incorporated by reference to the extend allowable by the law.

The optical electrowetting device according to the embodiments described herein could be incorporated in any optical system, for example in cameras, mobile telephones, ophthalmic tools, endoscopes, barcode readers, binoculars etc.

The electrowetting optical device may be used as or be part of a variable focal length liquid lens, an optical zoom, an ophthalmic device, an image stabilization device, a light beam deflection device, a variable illumination device and any other optical device using electrowetting.

The invention claimed is:

1. An optical electrowetting device comprising:
    a body comprising at least a first external surface and a first internal surface with a conical shape;
    a liquid-liquid interface between a first and a second immiscible liquids, the first liquid being a conducting liquid and the second liquid being an insulating liquid, wherein said liquid-liquid interface is able to move on said first internal surface by electrowetting effect;
    a first electrode in contact with the first liquid;
    a second electrode insulated from the first liquid by an insulating layer, said second electrode comprising a plurality of electrical conductive tracks to be connected to a voltage source and extending from said first external surface of the body to said first internal surface;
    a first layer covering the first internal surface of said body and being covered by said insulating layer, wherein the shape of the liquid-liquid interface is controllable by application of at least a first voltage between said first electrode and said plurality of electrical conductive tracks, and wherein said first layer is made of a resistive material having a surface resistivity from 75 k$\Omega$ to 500 k$\Omega$.

2. The optical electrowetting device according to claim 1, wherein said body is made of a resistive material.

3. The optical electrowetting device according to claim 2, wherein said body has a volume resistivity from $10^2$ to $10^6$ Ohm·cm.

4. The optical electrowetting device according to claim 2, wherein said body is made of an intrinsically conductive polymer.

5. The optical electrowetting device according to claim 2, wherein said body is made of a polymer charged with conductive particles.

6. The optical electrowetting device according to claim 5, wherein said body is made of a Liquid Crystal Polymer.

7. The optical electrowetting device according to claim 1, wherein the first layer is made of PEDOT PSS.

8. The optical electrowetting device according to claim 1, wherein the first layer is made of an epoxy comprising conductive particles.

9. The optical electrowetting device according to claim 1, wherein the first layer is made of Nickel Chrome alloy.

10. The optical electrowetting device according to claim 1, wherein said plurality of electrical conductive tracks is a thin film made of a conductive material, said conductive material being one of a metal, a conductive ink comprising metallic or carbon particles, Indium Tin Oxide, or a conductive polymer.

11. The optical electrowetting device according to claim 10, wherein said first layer is covering said plurality of electrical conductive tracks.

12. The optical electrowetting device according to claim 1, wherein the first layer being made of PEDOT PSS, at least a part of the plurality of electrical conductive tracks is made by locally irradiating the first layer with UV light to create at least one resistive region and said plurality of conductive tracks.

13. The optical electrowetting device according to claim 1, wherein the second electrode comprises four electrical conductive tracks.

14. The optical electrowetting device according to claim 1, wherein said first layer has a thickness from 10 nm to 5 µm.

15. The optical electrowetting device according to claim 1, which is or is included in at least one selected from a group consisting of a variable focal length lens, an optical zoom, an ophthalmic lens, a device having a variable tilt of the optical axis, an optical image stabilization device, a light beam deflector device, and a variable illumination device.

16. An imaging system comprising:
    an image sensor for capturing an image;
    a lens arrangement arranged to form an image on said image sensor, the lens arrangement comprising the optical electrowetting device of claim 1; and
    a driving circuitry arranged to generate at least one voltage applied between said first and second electrodes.

17. A digital camera comprising the imaging system of claim 16.

18. A mobile telephone comprising the imaging system of claim 17.

19. A method of manufacturing an optical electrowetting device comprising:
- providing a body comprising at least a first external surface and a first internal surface with a conical shape;
- providing a liquid-liquid interface between a first and a second immiscible liquids, the first liquid being a conducting liquid and the second liquid being an insulating liquid, wherein said liquid-liquid interface is able to move on said first internal surface by electrowetting effect;
- providing a first electrode in contact with the first liquid;
- providing a second electrode insulated from the first liquid by an insulating layer, said second electrode comprising a plurality of electrical conductive tracks to be connected to a voltage source and extending from said first external surface of the body to said first internal surface; and
- providing a first layer covering the first internal surface of said body and being covered by said insulating layer, wherein the shape of the liquid-liquid interface is controllable by application of at least a first voltage between said first electrode and said plurality of electrical conductive tracks, and wherein said first layer is made of a resistive material having a surface resistivity from 75 kΩ to 500 kΩ.

20. The method of manufacturing an optical electrowetting device according to claim 19, wherein said plurality of electrical conductive tracks is formed by evaporation of a conductive material on the body through holes of a 3D physical mask.

21. The method of manufacturing an optical electrowetting device according to claim 19, wherein said plurality of electrical conductive track is formed by locally irradiating by UV light said first layer being made of PEDOT PSS to create at least one resistive region and said plurality of conductive tracks.

* * * * *